(12) United States Patent
Dinant et al.

(10) Patent No.: US 10,488,030 B2
(45) Date of Patent: Nov. 26, 2019

(54) LIGHT DEVICE FOR A MOTOR VEHICLE

(71) Applicant: VALEO VISION BELGIQUE, Meslin l'eveque (BE)

(72) Inventors: Franck Dinant, Meslin l'eveque (BE); Dirkie Sacchet, Meslin l'eveque (BE); Florestan Debert, Meslin l'eveque (BE)

(73) Assignee: VALEO VISION BELGIQUE, Meslin l'eveque (BE)

( * ) Notice: Subject to any disclaimer, the term of this patent is extended or adjusted under 35 U.S.C. 154(b) by 0 days.

(21) Appl. No.: 16/037,484

(22) Filed: Jul. 17, 2018

(65) Prior Publication Data

US 2019/0017692 A1   Jan. 17, 2019

(30) Foreign Application Priority Data

Jul. 17, 2017   (FR) ...................................... 17 56738

(51) Int. Cl.
| | |
|---|---|
| *F21V 21/00* | (2006.01) |
| *F21V 29/74* | (2015.01) |
| *B60Q 1/04* | (2006.01) |
| *F21S 45/10* | (2018.01) |
| *F21S 43/14* | (2018.01) |
| *F21S 41/143* | (2018.01) |
| *F21S 45/49* | (2018.01) |
| *F21S 45/47* | (2018.01) |

(52) U.S. Cl.
CPC ............ *F21V 29/74* (2015.01); *B60Q 1/0483* (2013.01); *F21S 41/143* (2018.01); *F21S 43/14* (2018.01); *F21S 45/10* (2018.01); *F21S 45/47* (2018.01); *F21S 45/49* (2018.01)

(58) Field of Classification Search
CPC . F21V 29/74; F21S 43/14; F21S 45/10; F21S 45/49; F21S 41/142; F21S 45/47; B60Q 1/0483
USPC ......................................... 362/507, 546, 547
See application file for complete search history.

(56) References Cited

U.S. PATENT DOCUMENTS

| | | | |
|---|---|---|---|
| 2011/0058387 A1* | 3/2011 | Matsunaga | ............... F21K 9/00 362/547 |
| 2015/0369443 A1* | 12/2015 | Chang | ..................... F21S 41/19 362/516 |

(Continued)

FOREIGN PATENT DOCUMENTS

| | | |
|---|---|---|
| DE | 10 2005 044 447 A1 | 3/2007 |
| DE | 10 2006 017 718 A1 | 5/2007 |
| DE | 10 2015 223 143 A1 | 5/2017 |

OTHER PUBLICATIONS

French Preliminary Search Report dated Oct. 31, 2017 in French Application 17 56738 filed on Jul. 17, 2017 (with English Translation of Categories of Cited Documents).

*Primary Examiner* — Laura K Tso
(74) *Attorney, Agent, or Firm* — Oblon, McClelland, Maier & Neustadt, L.L.P.

(57) ABSTRACT

A light device for a motor vehicle, the light device including: a housing; a heat sink over moulded with the housing; at least one light source arranged directly on the heat sink; a control device for the electrical power supply of the at least one light source arranged in the housing and electrically connected to the light source; an optical element suitable for cooperating with light rays emitted by the at least one light source.

20 Claims, 8 Drawing Sheets

(56) References Cited

U.S. PATENT DOCUMENTS

2016/0061404 A1* 3/2016 Kosugi ................ F21S 43/195
                                                    362/516
2016/0290587 A1* 10/2016 Nakagawa ............ F21S 41/192
2016/0290621 A1  10/2016 Ozawa et al.
2017/0097136 A1*  4/2017 Hino .................... F21V 29/767

* cited by examiner

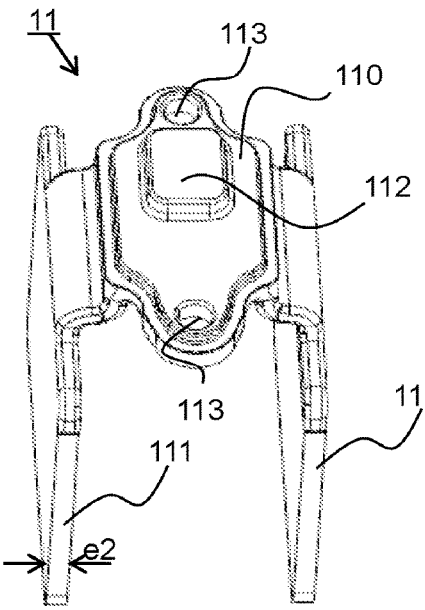
Fig. 3
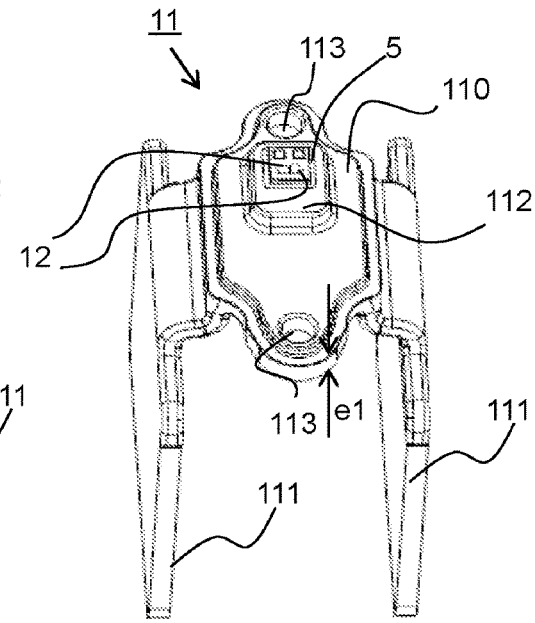
Fig. 4
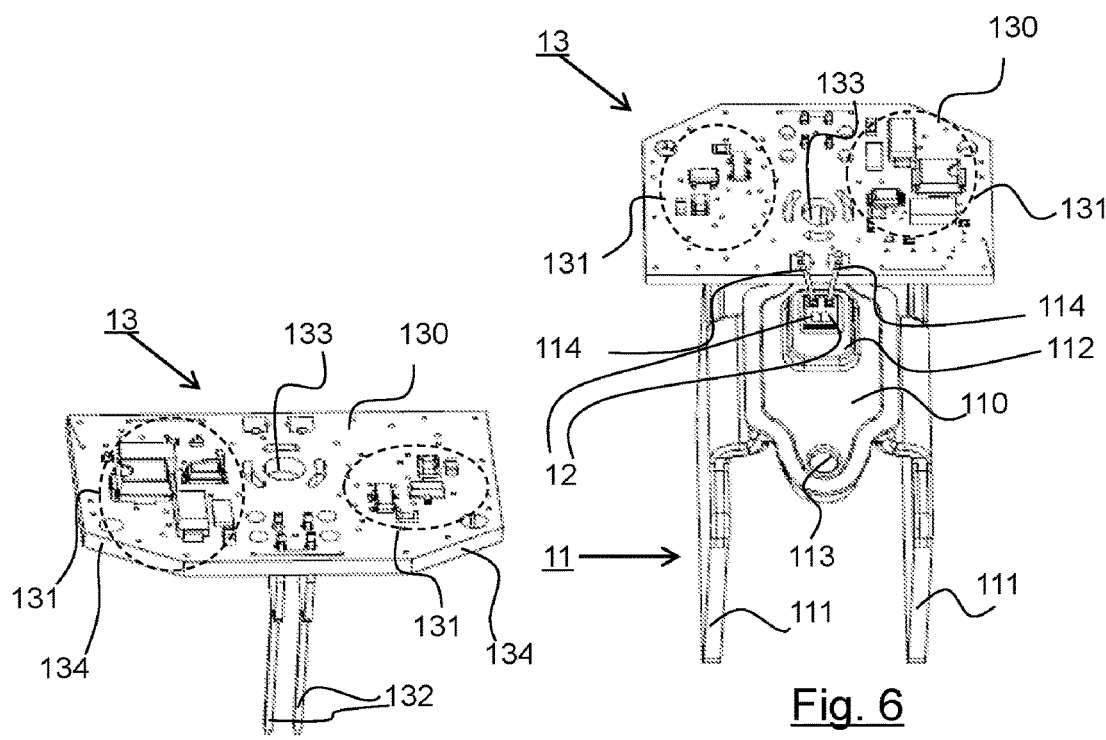
Fig. 5
Fig. 6

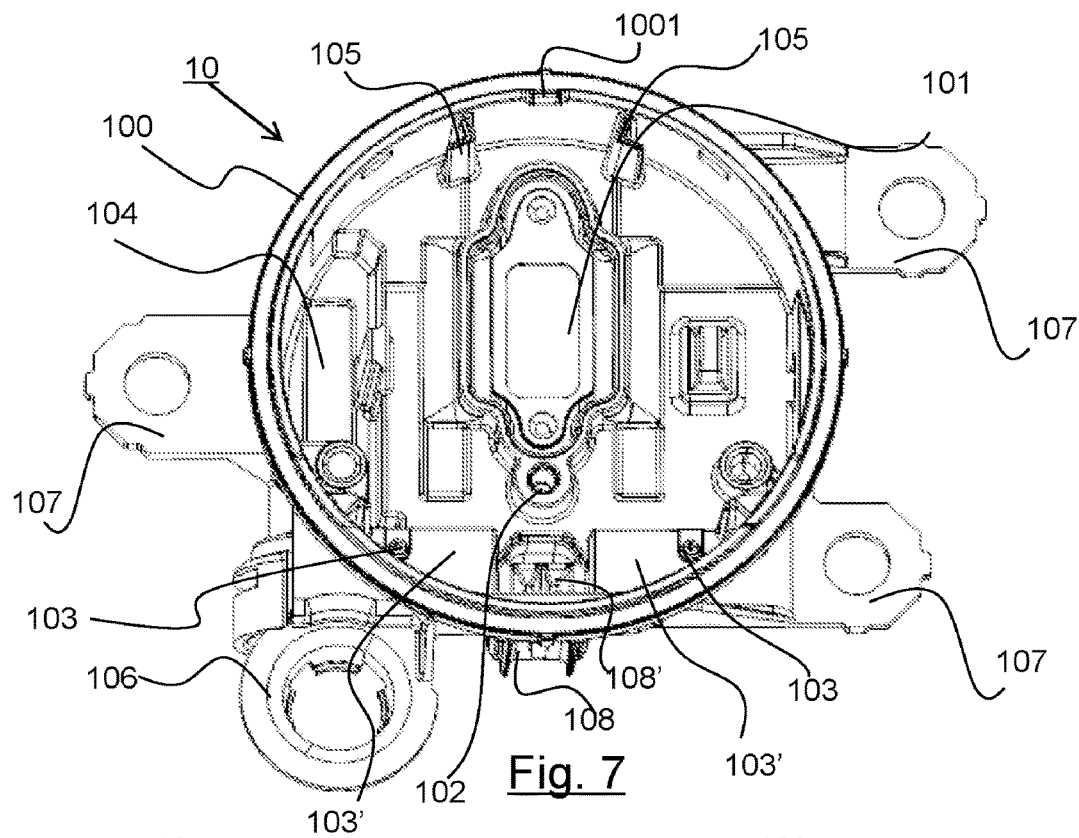
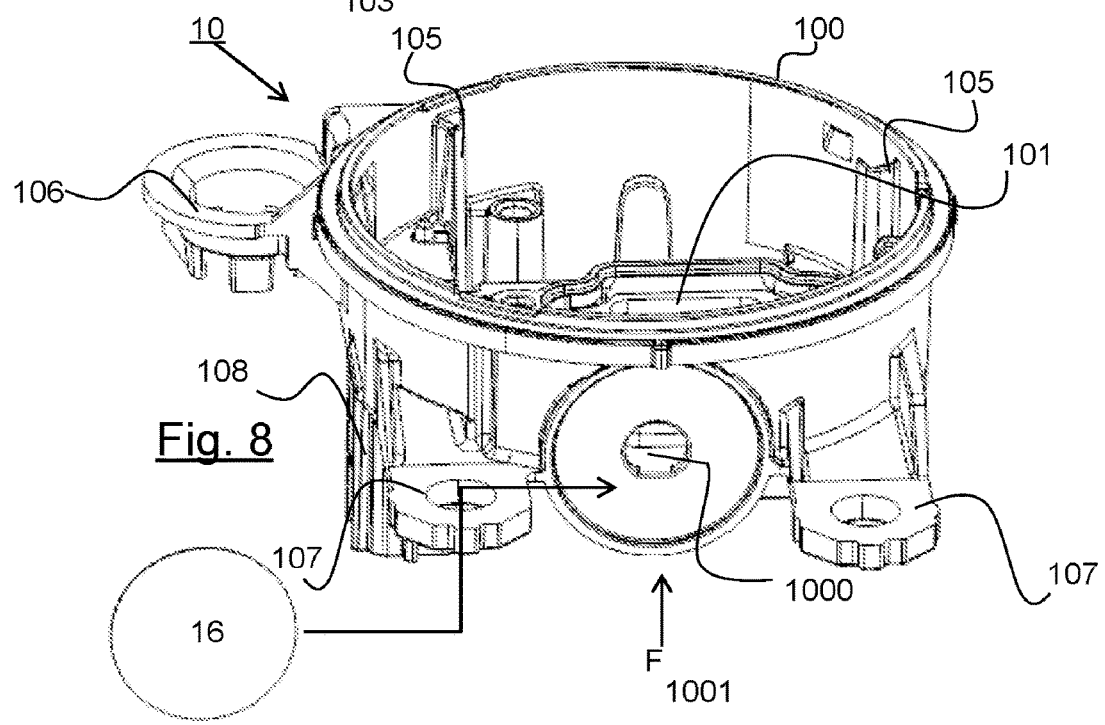

LIGHT DEVICE FOR A MOTOR VEHICLE

TECHNICAL FIELD OF THE INVENTION

The present invention relates to a light device for a motor vehicle.

It is particularly applicable, but in a nonlimiting manner, to motor vehicles.

TECHNOLOGICAL BACKGROUND OF THE INVENTION

A light device for a motor vehicle comprises, as is known to a person skilled in the art:
- a housing;
- a heat sink fixed to the housing by a mechanical fixing interface such as screws or a fixing clip, said heat sink comprising a plurality of fins, conventionally more than two;
- a printed circuit board;
- a light source arranged on said printed circuit board;
- an electronic component for controlling the electrical power supply of said light source, also arranged on said printed circuit board. The printed circuit board is housed in said housing.

One drawback with this state of the art is that the light device has a significant bulk and weight.

In this context, the present invention aims to resolve the abovementioned drawback.

GENERAL DESCRIPTION OF THE INVENTION

To this end, the invention proposes a light device for a motor vehicle, said light device comprising:
- a housing;
- a heat sink over moulded with said housing;
- at least one light source arranged directly on said heat sink;
- a control device for the electrical power supply of said at least one light source arranged in said housing and electrically connected to said light source;
- an optical element suitable for cooperating with light rays emitted by said at least one light source.

Thus, as will be seen in detail herein below, the volume of the light device is reduced by virtue, on the one hand, of the over moulding of the heat sink with said housing which makes it possible to eliminate the fixing interface, and by virtue, on the other hand, of the arrangement of the light source directly on the heat sink. Indeed, by placing the light source directly in contact with the heat sink, it is possible to improve the thermal performance levels and therefore to reduce the volume of the heat sink itself.

According to nonlimiting embodiments, the light device can also comprise one or more additional features out of the following:

According to a nonlimiting embodiment, said heat sink is made of sheet metal.

According to a nonlimiting embodiment, the sheet metal is made of aluminium.

According to a nonlimiting embodiment, said light device is a headlight and/or a fog light.

According to a nonlimiting embodiment, said heat sink comprises a central part and two lateral parts.

According to a nonlimiting embodiment, said central part has a thickness substantially equal to 2 mm, and the two lateral parts have a thickness substantially equal to 1.8 mm.

According to a nonlimiting embodiment, said control device comprises an electronic support arranged in said housing.

According to a nonlimiting embodiment, said housing comprises an accommodating surface for said control device.

According to a nonlimiting embodiment, said optical element is a lens and/or a reflector and/or a light guide.

According to a nonlimiting embodiment, said at least one light source is a semiconductor light source.

According to a nonlimiting embodiment, said at least one semiconductor light source forms part of a light-emitting diode.

According to a nonlimiting embodiment, said light device comprises a plurality of light sources.

BRIEF DESCRIPTION OF THE FIGURES

The invention and its various applications will be better understood on reading the following description and on studying the accompanying figures.

FIG. 3 represents a view of a heat sink of the light device of FIGS. 1 and 2, according to a nonlimiting embodiment;

FIG. 4 represents a view of the heat sink of FIG. 3 on which are mounted a plurality of light sources, according to a nonlimiting embodiment;

FIG. 5 represents a view of a control device of the light device of FIGS. 1 and 2, according to a nonlimiting embodiment;

FIG. 6 represents the control device for the electrical power supply of FIG. 5 electrically linked to the light sources of FIG. 4, according to a nonlimiting embodiment;

FIG. 7 represents a plan view of a housing of the light device of FIGS. 1 and 2, according to a nonlimiting embodiment;

FIG. 8 represents a side view of the housing of the light device of FIGS. 1 and 2, according to a nonlimiting embodiment;

DESCRIPTION OF EMBODIMENTS OF THE INVENTION

The elements that are identical, by structure or by function, appearing in different figures retain, unless specified otherwise, the same references.

The light device 1 for a motor vehicle according to the invention is described with reference to FIGS. 1 to 15.

In a nonlimiting embodiment, the light device 1 is a headlight and/or a fog light for a motor vehicle.

A motor vehicle should be understood to mean any type of motorised vehicle. In nonlimiting embodiments, a headlight is adapted to ensure a photometric function:

Called "High Beam" to produce a high beam; and/or
Called "Low Beam" to produce, for example, a low beam; and/or
called DRL to produce a daytime running light; and/or
called "Turn Indicator" to produce an indicator light.

Figure 1:
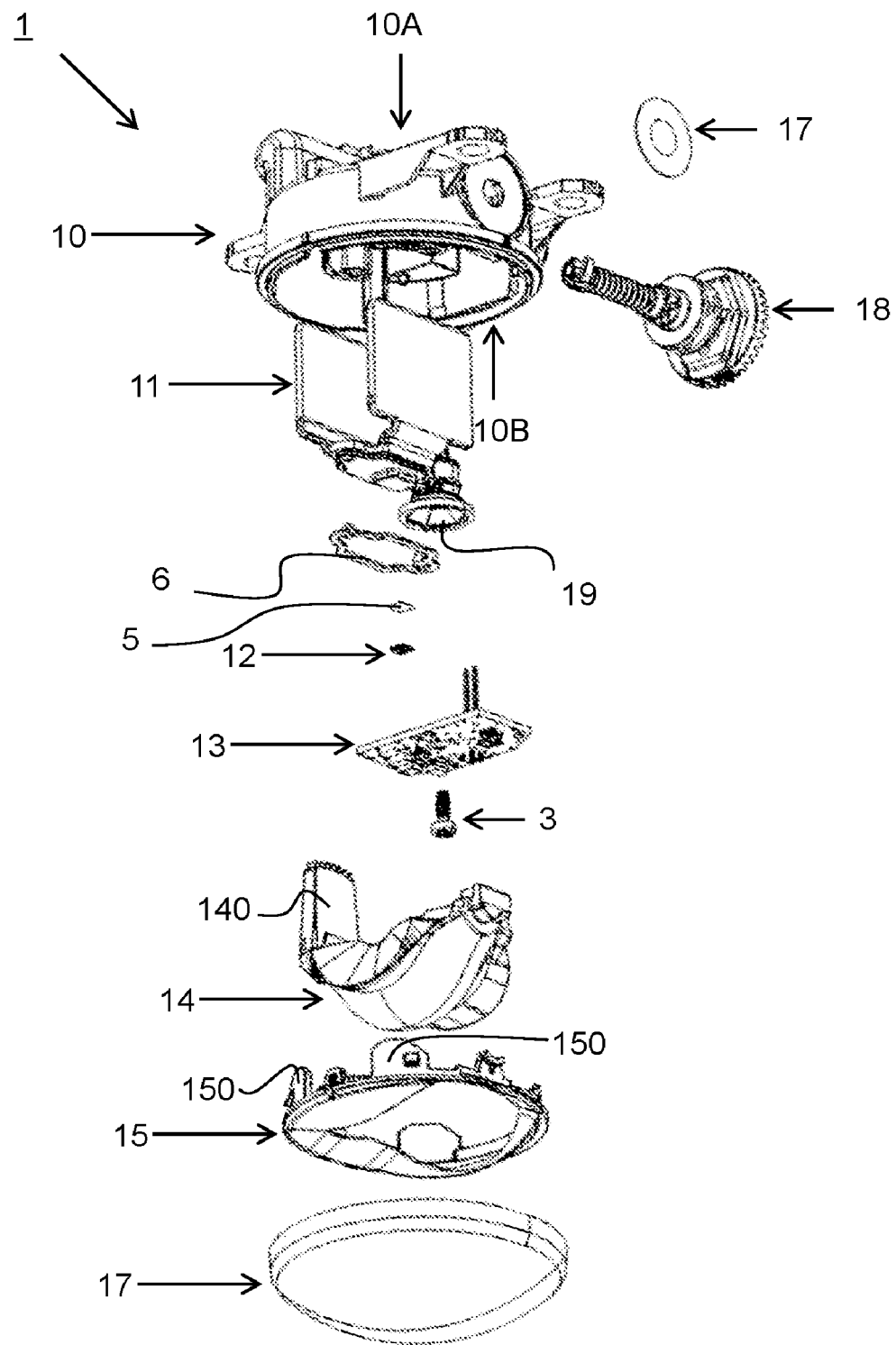
FIG. 1 represents an exploded perspective view of a light device for a motor vehicle, according to a nonlimiting embodiment of the invention.

As illustrated in FIG. 1, the light device 1 comprises:
a housing 10;
a heat sink 11;
at least one light source 12;
a control device 13 for the electrical power supply of said at least one light source 12;
an optical element 14.

In a nonlimiting embodiment, the light device 1 further comprises a mask 15 and an outer lens 17.

In a nonlimiting embodiment, the light device 1 further comprises a gear screw 18, also called setting a screw.

In a nonlimiting embodiment, the light device 1 comprises a plurality of light sources 12. This embodiment is taken as a nonlimiting example hereinafter in the description.

The elements of the light device 1 are described in detail herein below.

Housing 10

The housing 10 is illustrated in FIGS. 1, 2, and 8 to 13.

In a nonlimiting embodiment, the housing 10 is made of plastic material. In a nonlimiting example, the plastic material is PCSAN (polycarbonate and styrene-acrylonitrile) filled with glass fibres.

In a nonlimiting embodiment, the housing 10 has a substantially rounded form. That makes it possible to obtain, for example, a fog light of standard form.

As illustrated in FIG. 1, the housing 10 makes it possible to accommodate the light sources 12, the control device 13, the optical element 14 and the mask 15. It thus serves as protection for the light sources 12 and the control device 13 against the ingress of dust or of water.

Figure 2:
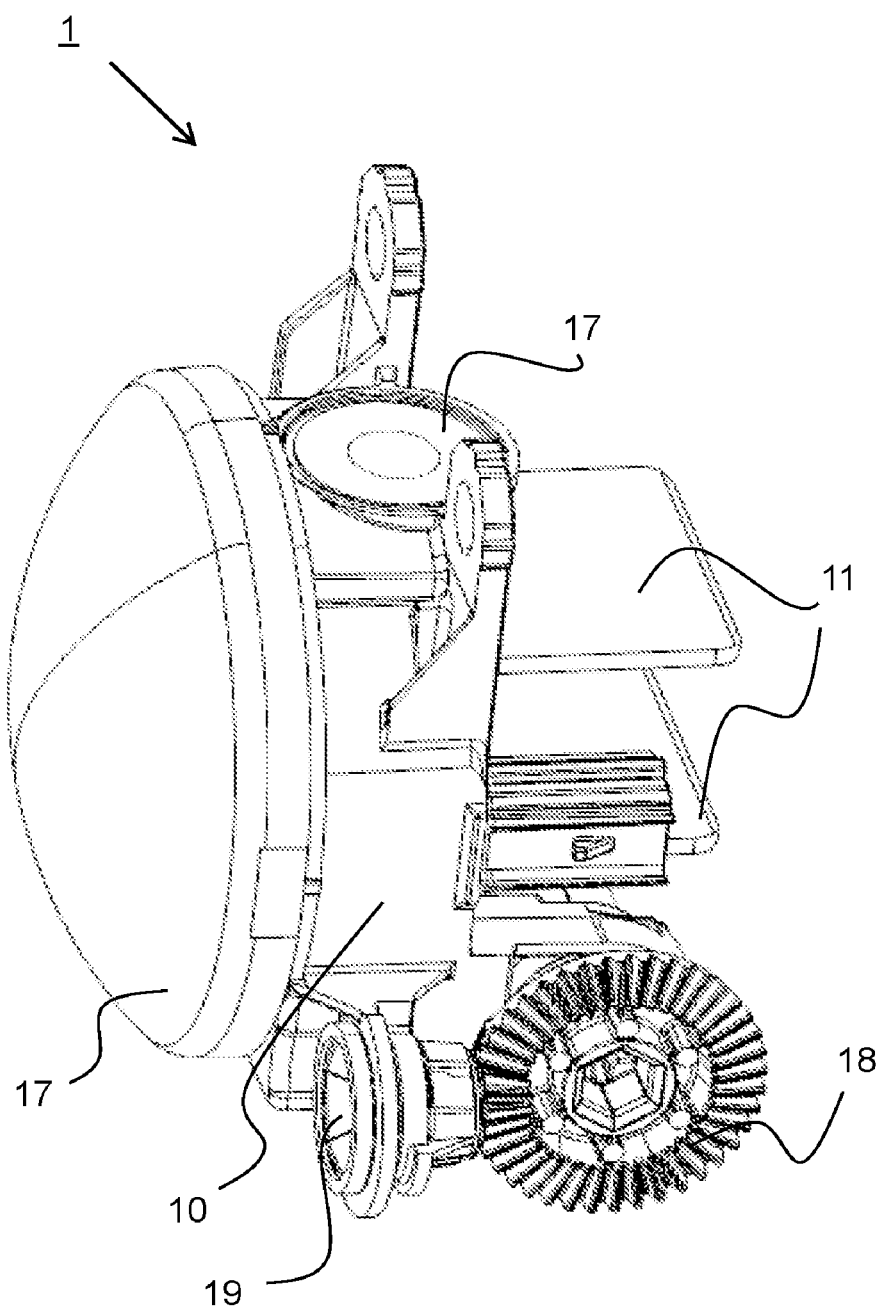
FIG. 2 represents an assembled view of the light device of FIG. 1, according to a nonlimiting embodiment.

As illustrated in FIG. 1 or FIG. 2, the housing 10 is closed on one side 10B by the outer lens 17. The heat sink 11 extends partly beyond the other side 10A of the housing 10, thus allowing the heat given off in particular by the light sources 12 to be dispelled out of the housing 10 via the lateral parts 111 (described later) of the heat sink 11.

Figure 9:
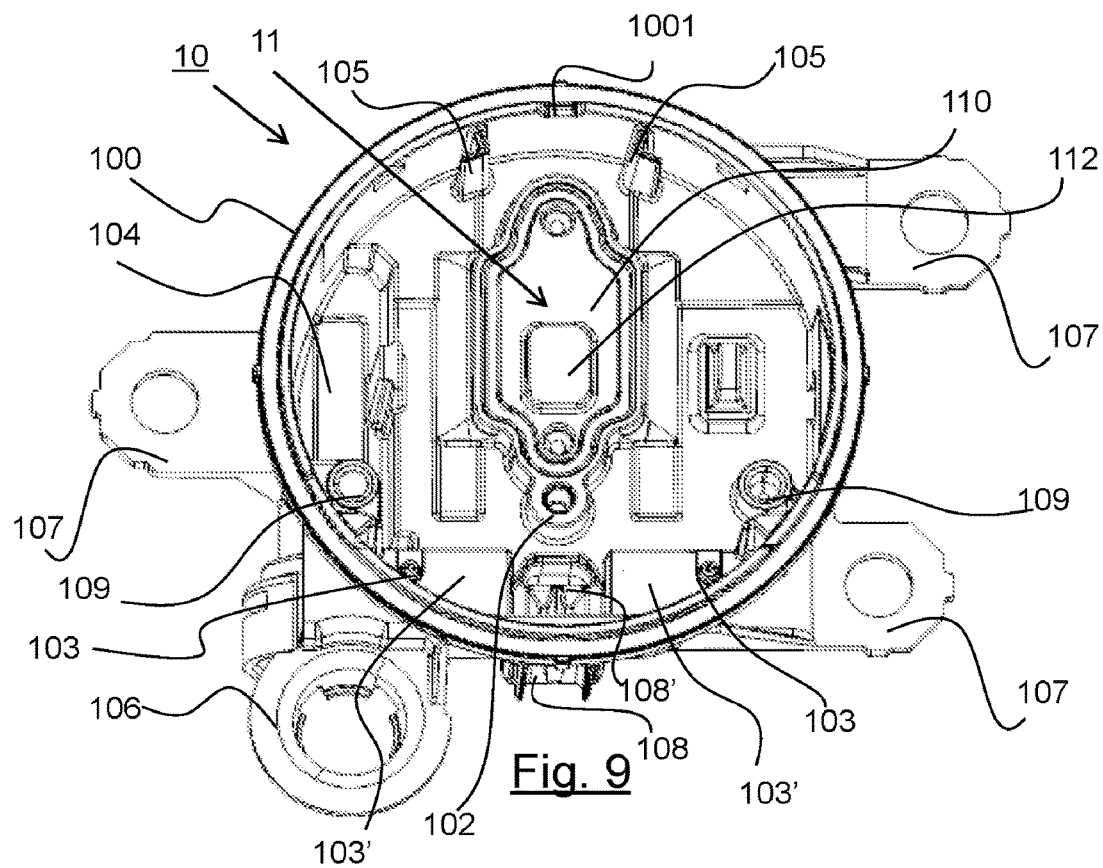
FIG. 9 represents the housing of FIGS. 7 and 8 with which the heat sink of FIG. 3 is over moulded, according to a nonlimiting embodiment.

As illustrated in FIG. 7, the housing 10 comprises an opening 101 in which a central part 110 of the heat sink 11 is housed after an over moulding of the housing 10 on said heat sink 11 as illustrated in FIG. 9.

As illustrated in FIG. 7, the housing 10 further comprises:
a fixing orifice 102 suitable for fixing the control device 13. This orifice is suitable for receiving a fixing screw 3 (illustrated in FIGS. 1 and 12);
at least one device 103 for positioning the control device 13. In a nonlimiting example, there are two positioning devices 103. In a nonlimiting embodiment, a positioning device 103 is a slug.
a through orifice 104 suitable for allowing through a gear portion 140 (illustrated in FIG. 1 and in FIG. 15) of the optical element 14;
at least one fixing device 105 for the mask 15. In a nonlimiting example, there are four fixing devices 105. In a nonlimiting embodiment, a fixing device 105 is a runner suitable for receiving a tab 150 (illustrated in FIG. 1) of the mask 15 which slides in said runner.
a cavity 106 suitable for receiving the gear screw 18, as illustrated also in FIGS. 12 and 15.
at least one tab 107 for fixing onto the motor vehicle. In a nonlimiting example that is illustrated, there are three fixing tabs;
a device 1001 for positioning the outer lens 17. In a nonlimiting embodiment, this positioning device 1001 is a mistake-proofing device;
a connector counterpart 108 suitable for accommodating a client connector (not illustrated) of the motor vehicle and pins of a power supply connector 132 of the control device 13 which will be connected to said client connector. This connector counterpart 108 comprises an access 103' to the interior of the housing 10 suitable for inserting the pins of the power supply connector 132 of the control device 13;
an accommodating surface 103', illustrated also in FIGS. 9 and 11, suitable for receiving the control device 13. It will be noted that said accommodating surface 103' is situated on either side of the access 108' to the connector counterpart 108.

As illustrated in FIG. 8, in a nonlimiting embodiment, the housing 10 further comprises an input orifice 1000 suitable for allowing the passage of an airflow F which will be able to circulate in the housing 10 and thus avoid any condensation inside said housing 10. The hydrophobic membrane 16 is arranged on said input orifice 1000 to protect the interior of the housing 10 against the ingress of liquid, such as water. This hydrophobic membrane 16 allows the passage of the airflow F but not liquids.

Heat Sink 11

The heat sink 11 is illustrated in FIGS. 1 to 4, and 7 to 11.

It is suitable for thermally dissipating the heat given off by the light sources 12 out of the housing 10. It can also dissipate a portion of the heat given off by the control device 13 (electronic components and printed circuit board on which the electronic components rest) out of the housing 10.

The heat sink 11 also makes it possible to position the light sources 12 relative to the optical element 14. It is thus used for indexing.

As illustrated in FIG. 3, the heat sink 11 comprises:
a central part 110;
two lateral parts 111 which extend on either side of the central part 110.

In a nonlimiting embodiment, the central part 110 has a width substantially equal to 15 mm and a length substantially equal to 30 mm (millimetres). In a nonlimiting embodiment, the central part 110 has a thickness e1 substantially equal to 2 mm.

In a nonlimiting embodiment, the lateral parts 111 have a width substantially equal to 34 mm and a length substantially equal to 33 mm. In a nonlimiting embodiment, the lateral parts 111 have a thickness e2 substantially equal to 1.8 mm.

The two lateral parts 111 form two dissipation fins.

In nonlimiting embodiments, the heat sink 11 further comprises:
a planar part 112 protruding from the central part 110 suitable for accommodating the light sources 12;
at least one indexing orifice 113. In a nonlimiting embodiment that is illustrated, there are two indexing orifices 113. The indexing orifices 113 are suitable for positioning the heat sink 11 in the mould which will mould the housing 10 and make it possible to locate the placement of the light sources 12 when they are glued onto the heat sink 11.

In a nonlimiting embodiment, the heat sink 11 is made of sheet metal. It is thus easy to produce. Thus, the sheet metal can be stamped and folded and cut, or cut and stamped, or cut and folded, etc. Moreover, that makes it possible to render the heat sink 11 more compact compared to a heat sink produced in injection-moulded aluminium. In a nonlimiting variant embodiment, the sheet metal is made of aluminium. This is a material that is lightweight and which has good thermal performance levels.

Figure 10:
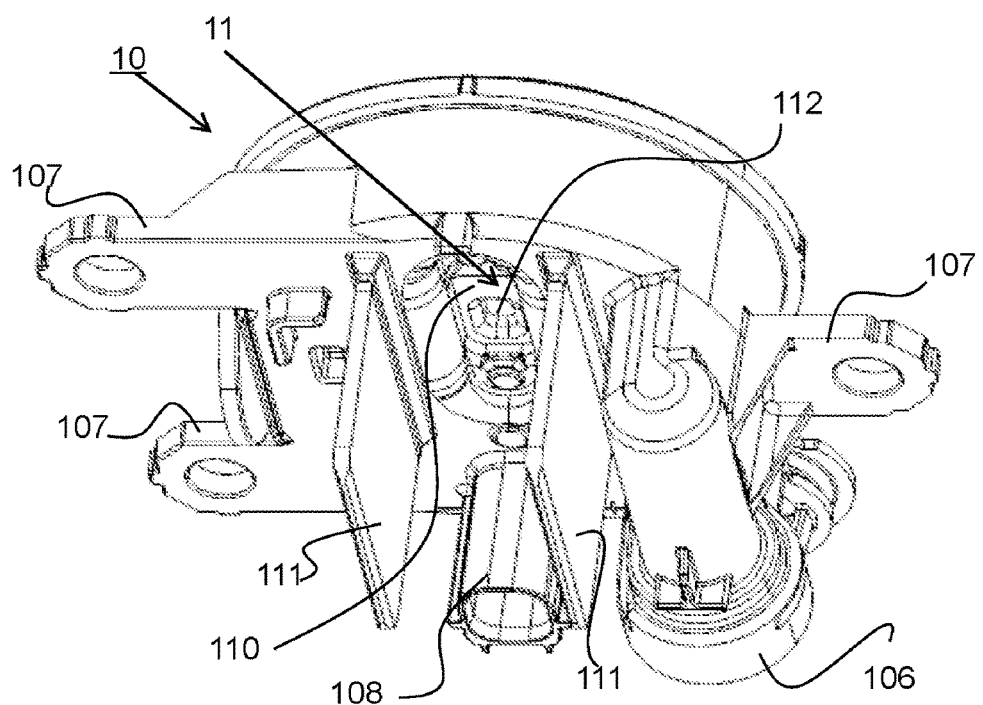
FIG. 10 represents a rear view of the housing of FIG. 9.

The heat sink 11 is over moulded with said housing 10 as illustrated in FIGS. 9 and 10.

Thus, after the production of the heat sink 11, it is placed as an insert in a mould of the housing 10, then plastic is injected to produce the housing 10. A housing 10 with over moulded heat sink 11 assembly is thus obtained.

Thus, it is pointless in this case to have a fixing interface between the housing and the heat sink as in the prior art. The weight of the heat sink 11, its bulk and its production costs are thus reduced. It will also be noted that because of the elimination of this fixing interface, a silicon seal conventionally of O-ring type, which was necessary between said fixing interface and the housing to seal the light device assembly, has also been eliminated. Consequently, a step of mechanical coupling for such a seal has been eliminated. In a nonlimiting embodiment, this O-ring silicone seal is replaced by a seal 6 (illustrated in FIGS. 1 and 11) between the housing 10 and the heat sink 11 which is a bead of glue (in a nonlimiting example) to take up, if necessary, the expansion differences between said housing 10 and the heat sink 11 and consequently avoid the passage of liquid, such as water. A bead of glue is much less costly than an O-ring silicon seal and the method for applying it is much less costly than that for the assembly of an O-ring silicon seal.

Light Source 12

Said at least one light source 12 is illustrated in FIGS. 1, 4, 7, 10 and 11.

It emits light rays which, when they cooperate with the optical element 14, make it possible to produce a light beam from the light device 1.

In a nonlimiting embodiment, said at least one light source 12 is a semiconductor light source.

In a nonlimiting embodiment, the semiconductor light source forms part of a light-emitting diode. Light-emitting diode should be understood to mean any type of light-emitting diode, whether it be, in nonlimiting examples, LEDs (Light Emitting Diode), an OLED (Organic LED) or an AMOLED (Active-Matrix-Organic LED), or even an FOLED (Flexible OLED).

In a nonlimiting embodiment, the light device 1 comprises a plurality of light sources 12. In the nonlimiting example of FIG. 4, it comprises two light sources 12.

As illustrated in FIG. 4, these light sources 12 are arranged directly on the heat sink 11. In particular, in a nonlimiting embodiment, they are glued onto the heat sink 11 by means of a glue 5 illustrated in FIG. 1. The heat sink 11 thus serves as a support for the light sources 12.

Thus, by being mounted directly on the heat sink 11 and therefore being in direct contact with said heat sink 11, it becomes possible to improve the thermal dissipation of said light sources 12. Thus, it is possible:

to use high-performance light sources 12, such as light sources used for fog lights. In a nonlimiting example, the high-performance light sources 12 make it possible to emit light rays of 530 Lm (lumens). It will be noted that, for a conventional headlight, the power is 350 Lm.

to reduce the heat exchange surface of the heat sink 11 with the light sources 12. The size of the heat sink 11 can thus be reduced (central part 110 and fins 111).

Figure 12:
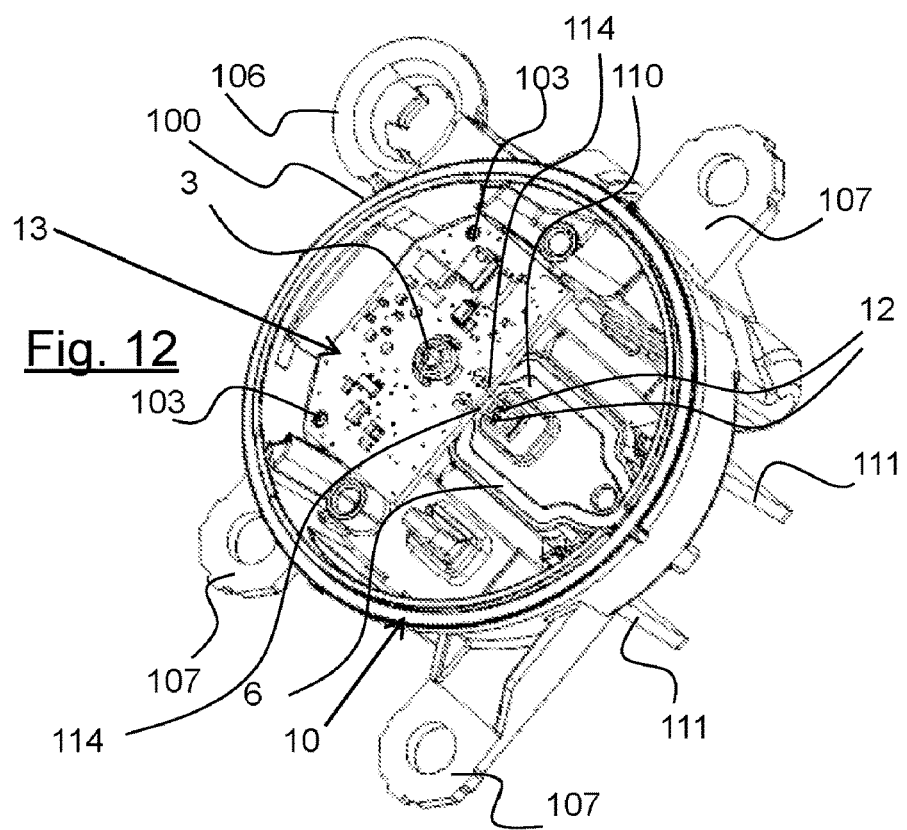
FIG. 12 represents the housing, the heat sink and the light sources of FIG. 11, light sources which are linked electrically to the control device of FIGS. 5 and 6, according to a nonlimiting embodiment.
Figure 13:
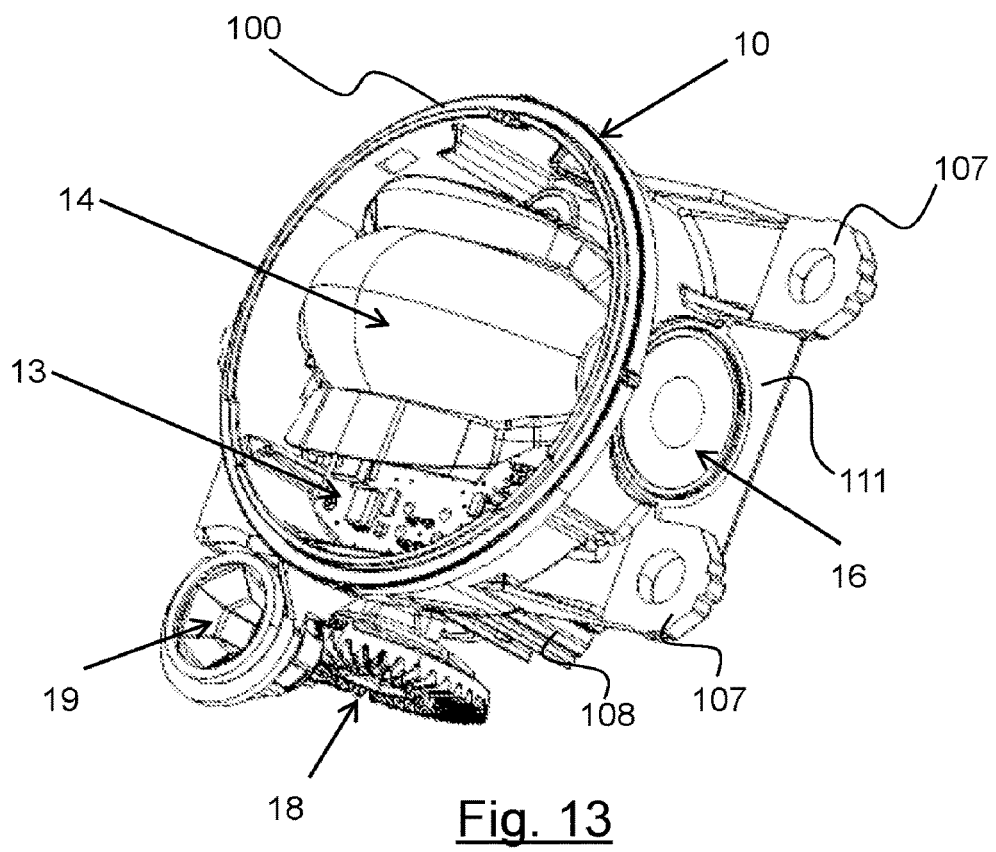
FIG. 13 represents the housing, the heat sink, the light sources and the control device of FIG. 12, on which housing is mounted an optical element, according to a nonlimiting embodiment.
Figure 14:
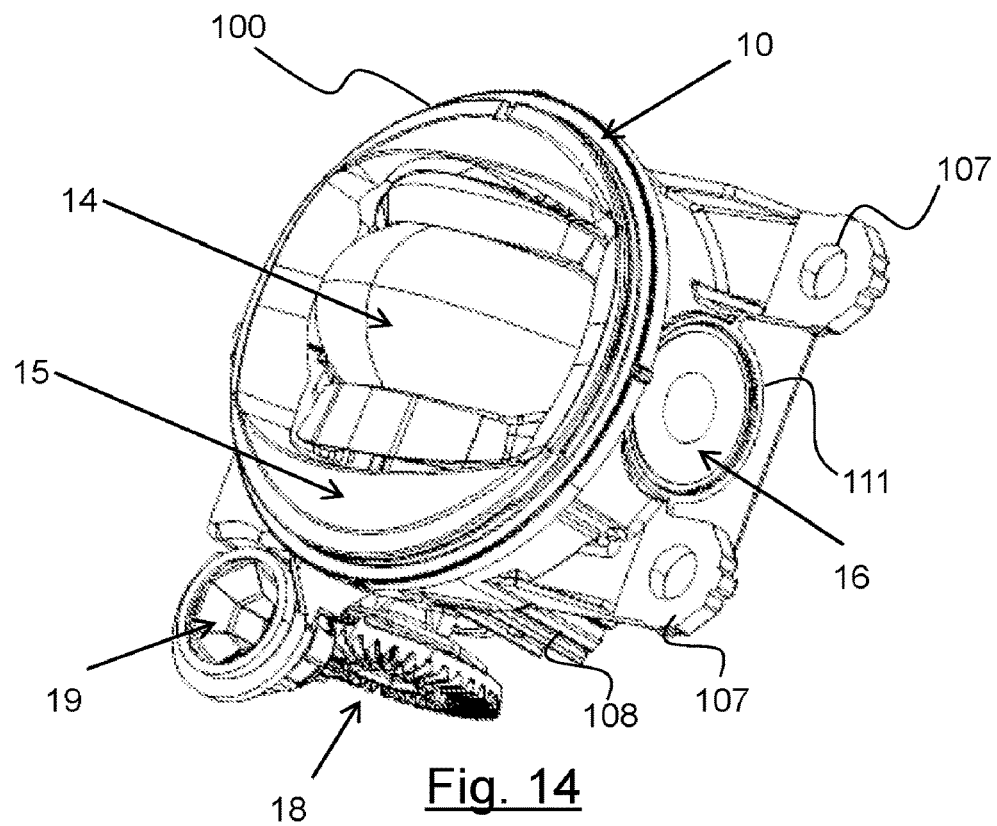
FIG. 14 represents the housing, the heat sink, the light sources, the control device and the light element of FIG. 13, on which housing is mounted a mask.

As illustrated in FIGS. 6 and 12, the light sources 12 are linked to the control device 13, each by a connecting wire 114. In a nonlimiting example, the connecting wire 114 is made of aluminium.

Figure 11:
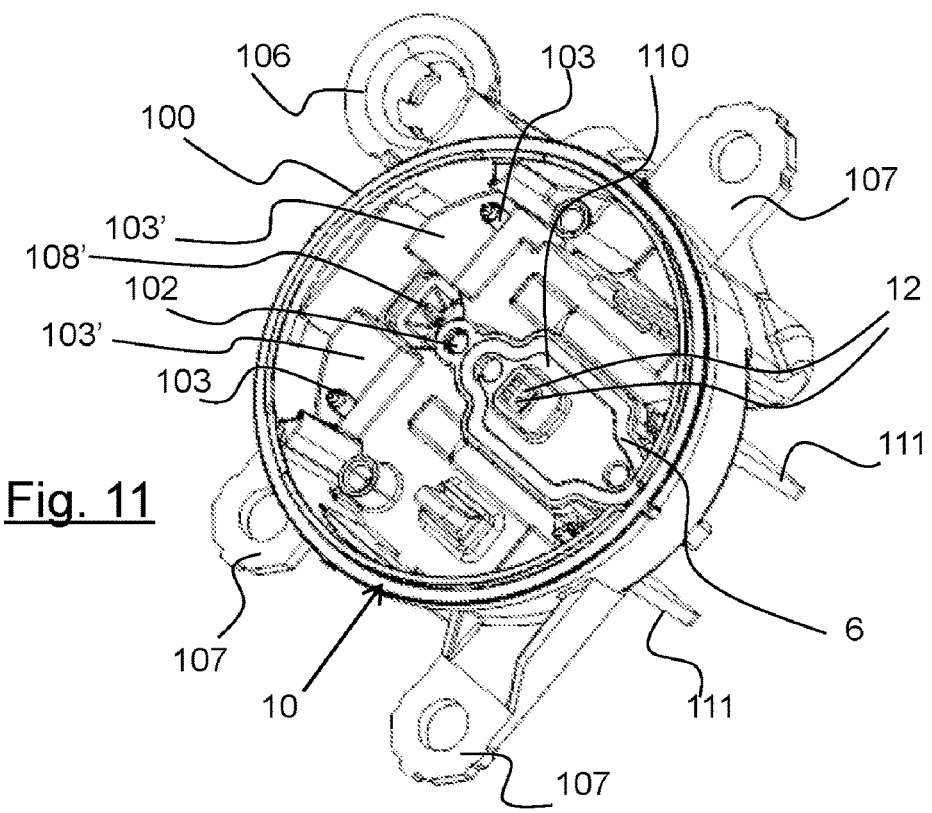
FIG. 11 represents the housing and the heat sink of FIGS. 9 and 10, on which heat sink light sources are arranged, according to a nonlimiting embodiment.

As illustrated in FIGS. 11 and 12, the light sources 12 are arranged in the housing 10 which thus serves as protection for them.

Control Device 13

The control device 13 is illustrated in FIGS. 1, 5 and 11.

The control device 13 is suitable for controlling the electrical power supply of the light sources 12. To this end, the control device 13 is linked electrically to the light sources 12 by ribbon bonding 114 for each light source 12 illustrated in FIGS. 6 and 12. Since the control of the electrical power supply is known to a person skilled in the art, it is not described here.

As illustrated in FIGS. 5 and 6, the control device 13 comprises an electronic support 130 on which are arranged electronic components 131 including at least one electronic control component suitable for controlling the electrical power supply of the light sources 12. In a nonlimiting embodiment, the control device 13 is a DC/DC converter, or a resistive or linear control device 13. In a nonlimiting embodiment, the control device 13 can comprise MOSFET transistors.

The electronic components 131 are arranged on at least one face of the electronic support 130. In the nonlimiting example illustrated in FIGS. 5 and 6, they are arranged on a single face.

The electronic support 130 is arranged in said housing 10. In particular, it rests on the accommodating surface 103' of the housing 10.

In a nonlimiting embodiment, the electronic support 130 is a printed circuit board assembly PCBA.

Moreover, the control device 13 comprises:
a power supply connector 132 suitable for connecting the control device 13 to a power source of the motor vehicle via a client connector. The power supply connector 132 comprises two pins, one positive and one negative. In a nonlimiting example, said power source is a 12 V battery; and
a fixing orifice 133 suitable for accommodating a fixing screw 3 (illustrated in FIG. 6) for its fixing to the housing 10 as illustrated in FIG. 12. The housing 10 thus serves as a support for said control device 13.

The control device 13 is arranged in such a way as to be able to be incorporated in said housing 10 as illustrated in FIG. 12. To this end, in the nonlimiting example illustrated it has a substantially rectangular form with two oblique edges 134 so as to be adapted to the rounded form of the housing 10.

Optical Element 14

The optical element 14 is suitable for distributing the light rays originating from the light sources 12 on the road. It thus cooperates with the light rays from the light sources 12 to give a light beam which lights the road.

In a nonlimiting example, the optical element 14 is a lens and/or a reflector and/or a light guide. In the nonlimiting example illustrated it is a lens.

Figure 15:
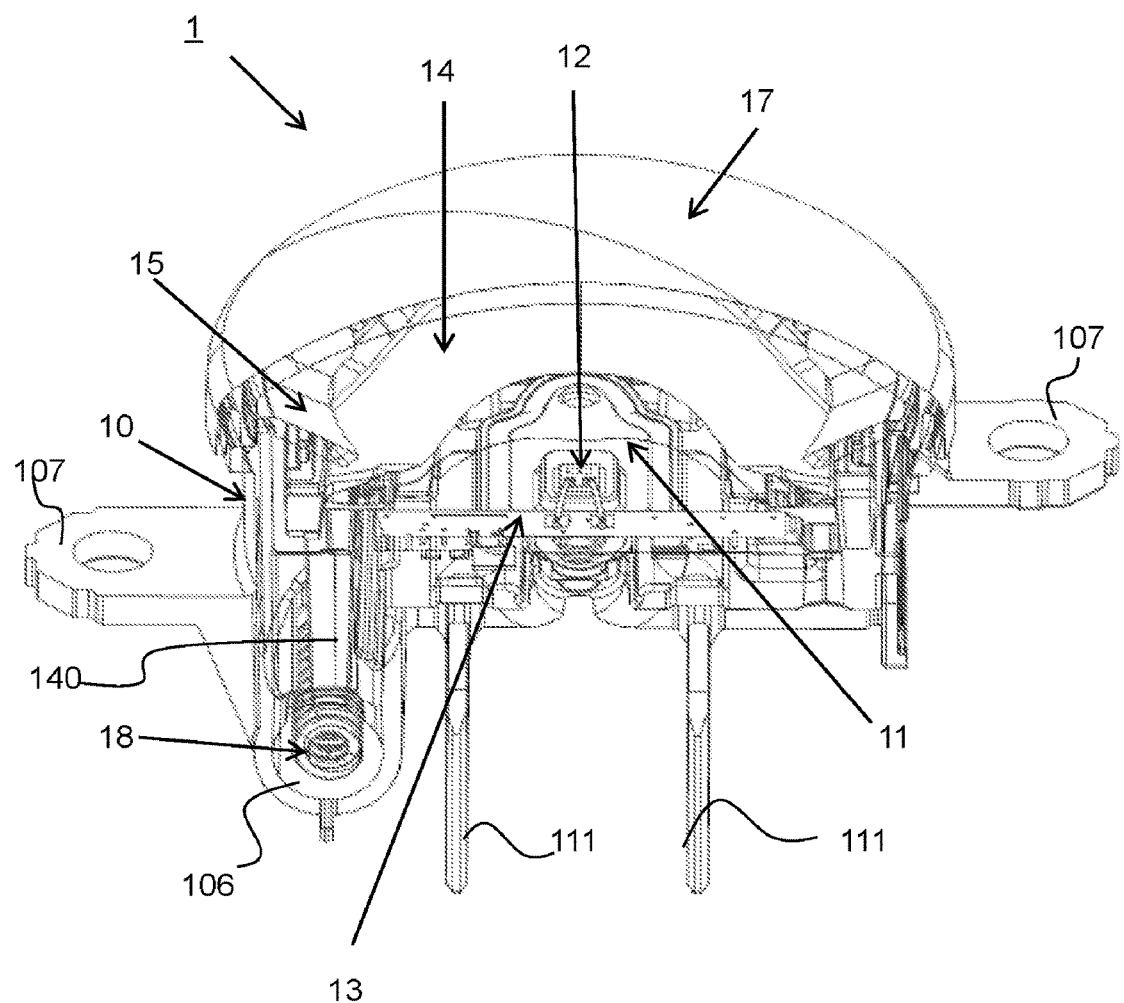
FIG. 15 is a cross-sectional view of the light device of FIGS. 1 and 2.

The optical element 14 comprises a gear portion 140 (illustrated in FIGS. 1 and 15) suitable for cooperating with the gear screw 18 as illustrated in FIG. 15.

The gear portion 140 is suitable for inserting into the through orifice 104 of the housing 10 so as to cooperate with said gear screw 18.

Gear Screw 18

The gear screw 18 is suitable for adjusting the rotation of the optical element 14 so as to have a cut-off line of the light beam at the desired level relative to the horizontal of the road. It thus takes up the level control of the motor vehicle. Said gear screw 18 is suitable for being manually controlled by a screwdriver or by a power screwdriver. It allows for an adjustment under the light device 1.

In a nonlimiting embodiment, the light device 1 further comprises an adjustment pinion 19 illustrated in FIGS. 1 and 2, 13 and 14, suitable for setting the orientation of the optical element 14 from the front of the light device 1. The adjustment pinion 19 is suitable for being manually controlled by the same tools as the gear screw 18.

Mask 15 and Outer Lens 17

The mask 15 has an aesthetic function. It also has a mechanical function, namely it makes it possible to hold the optical element 14 in position in the housing 10.

The outer lens 17 is made of plastic material and is domed. It makes it possible to protect the elements in the housing 10 against dust and the ingress of water.

It is screwed onto the edge 100 of the housing 10.

Obviously, the description of the invention is not limited to the embodiments described above.

Thus, in a nonlimiting embodiment, the electronic components 131 can be arranged on both faces of the electronic support 130.

Thus, in a nonlimiting embodiment, the housing 10 can have a form other than rounded, for example substantially rectangular.

Thus, in a nonlimiting embodiment, the heat sink 11 can comprise more than two fins 111.

Thus, in a nonlimiting embodiment, a connecting wire (called "wire bonding") can be used in place of the ribbon bonding 114.

Thus, the invention described offers in particular the following advantages:
- the heat dissipation is better by virtue of the mounting of the light sources 12 directly on the heat sink 11;
- since the heat dissipation is better, it makes it possible to reduce the dimensions of the heat sink 11, in particular the number of its fins, its surface and its thickness. Its volume and its weight and consequently its cost, are thus reduced;
- the possibility of reducing the dimensions of the heat sink 11 makes it possible to reduce the cost and the weight of the heat sink by using a sheet metal production method instead of an aluminium injection moulding production method;
- it thus makes it possible to considerably reduce the cost of the heat sink 11. The reduction of the cost of the heat sink 11 is roughly 70%;
- it thus makes it possible to reduce the volume and the weight of the heat sink 11. Thus, the reduction of the weight of the heat sink 11 is roughly 80% compared to a heat sink made of injection-moulded aluminium with a plurality of fins;
- it makes it possible to reduce the surface of the electronic support 130 which no longer comprises the light sources 12, contrary to the prior art;
- it thus makes it possible to reduce the volume, the weight and the cost of the light device 1 as a whole compared to a light device which comprises a heat sink made of injection-moulded aluminium with a plurality of fins, a fixing interface and an O-ring silicone seal;
- it makes it possible to have a lower thermal resistance of the light device 1. Indeed, in the prior art, the printed circuit board on which the light sources are located is not a good conductor of heat and thus constitutes a barrier between said light sources and said heat sink for heat dissipation of said light sources. In the light device 1 described in the description and that is the subject of the invention, the printed circuit board no longer forms an obstacle for the conduction of heat between the light sources 12 and the heat sink 11.

The invention claimed is:

1. Light device for a motor vehicle, said light device comprising:
   - a housing;
   - a heat sink over moulded with said housing, the heat sink including a central part and
   - a planar part protruding from the central part;
   - at least one light source arranged directly on the planar part of the heat sink;
   - a control device for an electrical power supply of said at least one light source arranged in said housing and electrically connected to said light source;
   - an optical element suitable for cooperating with light rays emitted by said at least one light source.

2. The light device according to claim 1, wherein said heat sink is made of sheet metal.

3. The light device according to claim 2, wherein the sheet metal is made of aluminium.

4. The light device according to claim 1, wherein said light device is a fog light or a headlight.

5. The light device according to claim 1, wherein said heat sink further comprises two lateral parts.

6. The light device according to claim 5, wherein the central part has a thickness substantially equal to 2 mm, and the two lateral parts have a thickness substantially equal to 1.8 mm.

7. The light device according to claim 1, wherein said control device comprises an electronic support arranged in said housing.

8. The light device according to claim 1, wherein said housing comprises an accommodating surface for said control device.

9. The light device according to claim 1, wherein said optical element is a lens or a reflector or a light guide.

10. The light device according to claim 1, wherein said at least one light source is a semiconductor light source.

11. The light device according to claim 10, wherein the semiconductor light source forms a part of a light-emitting diode.

12. The light device according to claim 1, wherein said light device comprises a plurality of light sources.

13. The light device according to claim 2, wherein said light device is a fog light or a headlight.

14. The light device according to claim 3, wherein said light device is a fog light or a headlight.

15. The light device according to claim 2, wherein said heat sink further comprises two lateral parts.

16. The light device according to claim 3, wherein said heat sink further comprises two lateral parts.

17. The light device according to claim 4, wherein said heat sink further comprises two lateral parts.

18. The light device according to claim 2, wherein said control device comprises an electronic support arranged in said housing.

19. The light device according to claim 3, wherein said control device comprises an electronic support arranged in said housing.

20. The light device according to claim 4, wherein said control device comprises an electronic support arranged in said housing.

* * * * *